United States Patent
Watanabe et al.

(10) Patent No.: US 6,924,946 B2
(45) Date of Patent: Aug. 2, 2005

(54) LENS DIAPHRAGM DEVICE, VIDEO CAMERA INCORPORATED WITH THE SAME, AND LENS FOR THE VIDEO CAMERA

(75) Inventors: Yuko Watanabe, Saitama (JP); Michio Inoue, Saitama (JP); Yasunori Miyauchi, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 0 days.

(21) Appl. No.: 10/443,048

(22) Filed: May 22, 2003

(65) Prior Publication Data
US 2003/0223128 A1 Dec. 4, 2003

(30) Foreign Application Priority Data
Jun. 3, 2002 (JP) ........................................ 2002-161411

(51) Int. Cl.[7] .............................. G02B 9/08; G03B 9/02
(52) U.S. Cl. ........................ 359/739; 359/740; 396/505; 396/510
(58) Field of Search ................................. 359/739, 740, 359/730, 738; 396/505, 510, 351

(56) References Cited

U.S. PATENT DOCUMENTS

| | | | | |
|---|---|---|---|---|
| 5,394,212 A | * | 2/1995 | Morizumi | ................... 396/505 |
| 5,479,298 A | * | 12/1995 | Yanagi et al. | ................ 359/888 |
| 5,721,995 A | * | 2/1998 | Katsura et al. | .............. 396/351 |

FOREIGN PATENT DOCUMENTS

| | | | | |
|---|---|---|---|---|
| JP | 08043878 A | 2/1996 | ............ G03B/9/02 |
| JP | 2002-258346 | * | 2/2001 | |
| JP | 2002258346 A | 9/2002 | ............ G03B/9/02 |

* cited by examiner

*Primary Examiner*—Timothy Thompson
(74) *Attorney, Agent, or Firm*—Jacobson Holman PLLC

(57) ABSTRACT

The present invention is directed to a lens diaphragm device that can avoid a degradation of an image due to both diffraction of a light beam and flares. The diaphragm device includes two diaphragm vanes (2 and 4) that respectively have notches (28 and 36) opposed to each other in a single plane perpendicular to an optical axis (O), and two of the vanes are moved close to and apart from each other in the single plane so as to vary an aperture of the lens diaphragm. The lens diaphragm device also includes two optical filters (6 and 8) used to reduce a quantity of a beam of light passing through the diaphragm, and an aperture of the diaphragm defined by edges of the optical filters and the notches of the vanes is shaped to be asymmetrical about straight line which crosses the optical axis and is perpendicular to directions of the motion of the vanes.

9 Claims, 17 Drawing Sheets

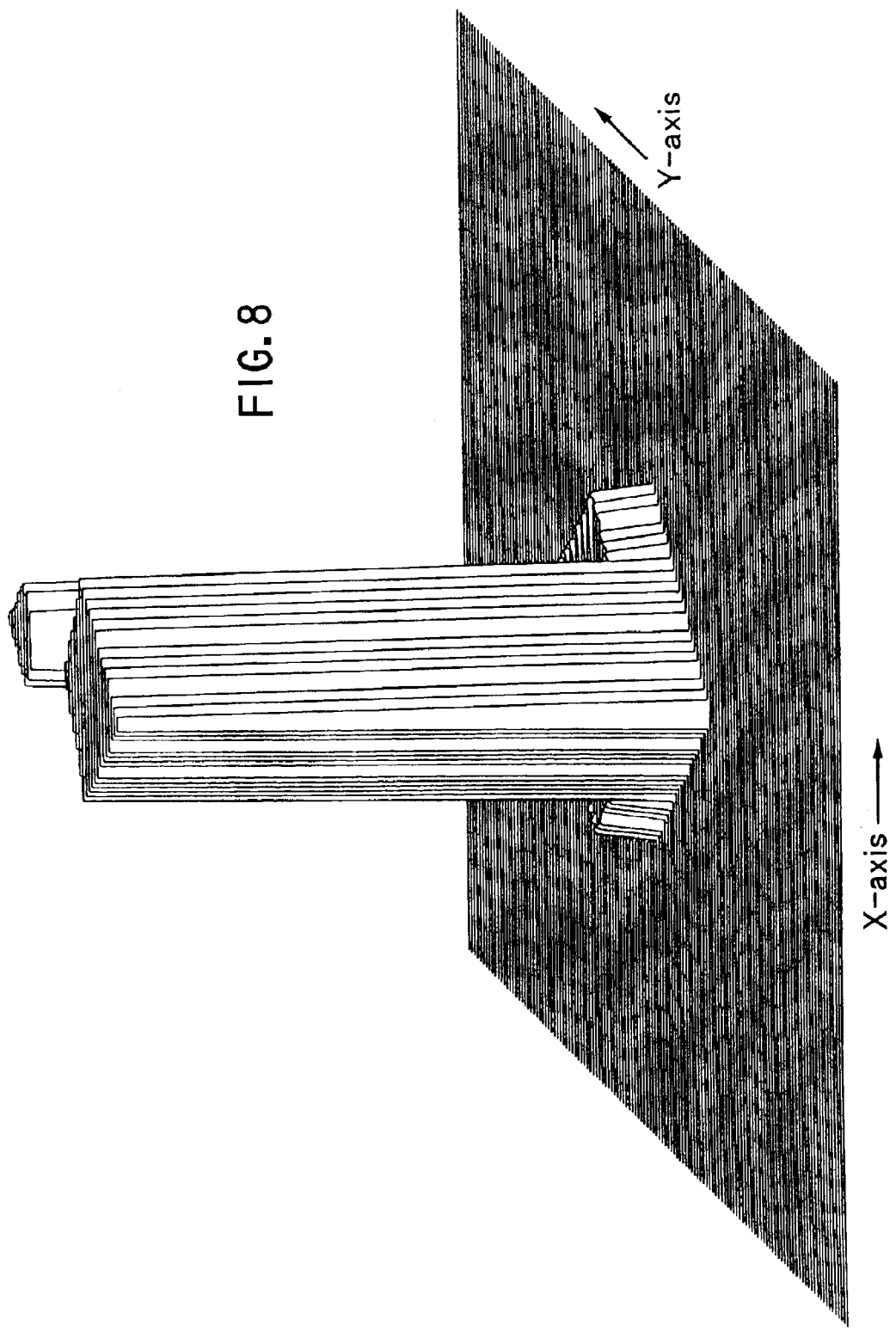

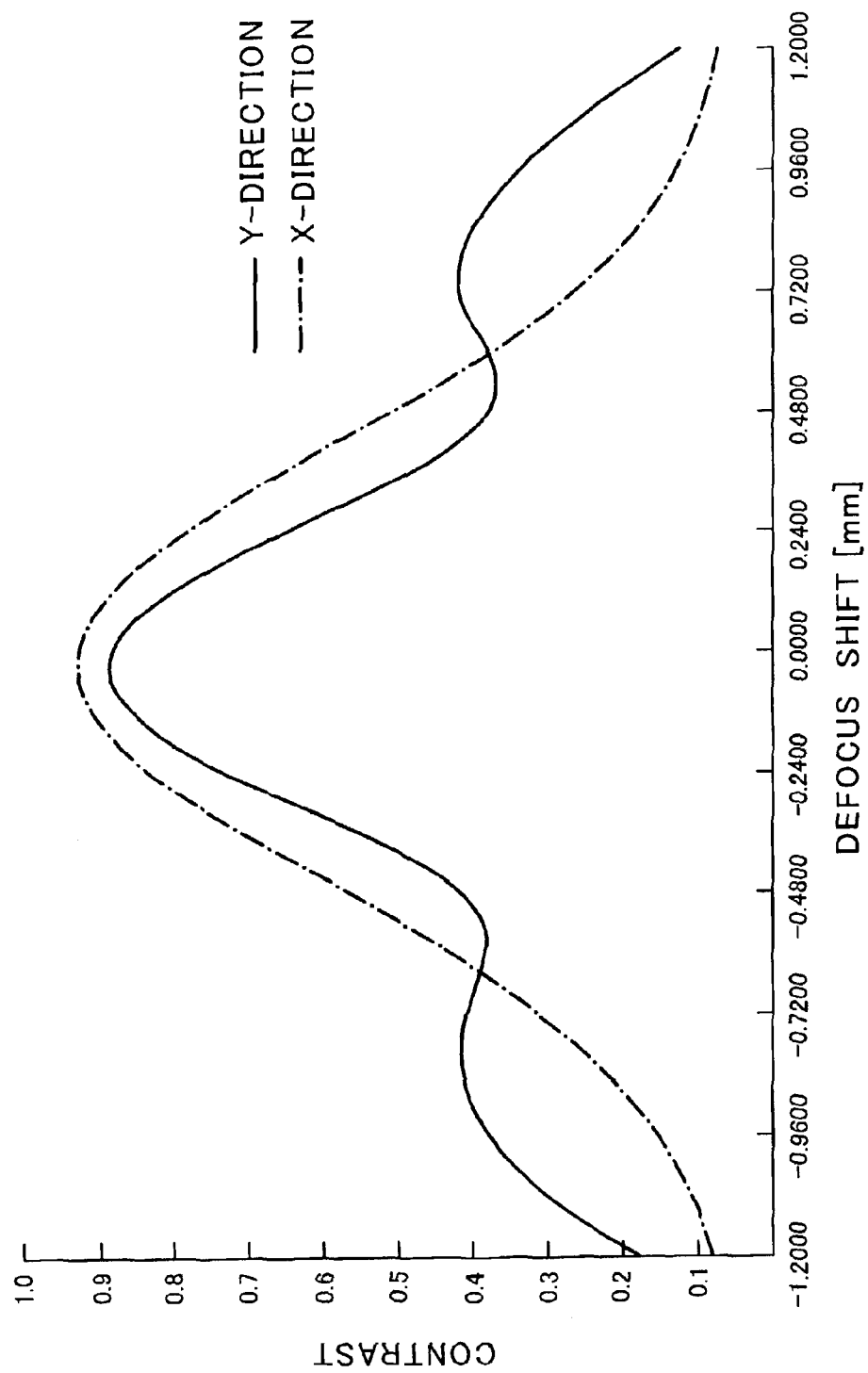

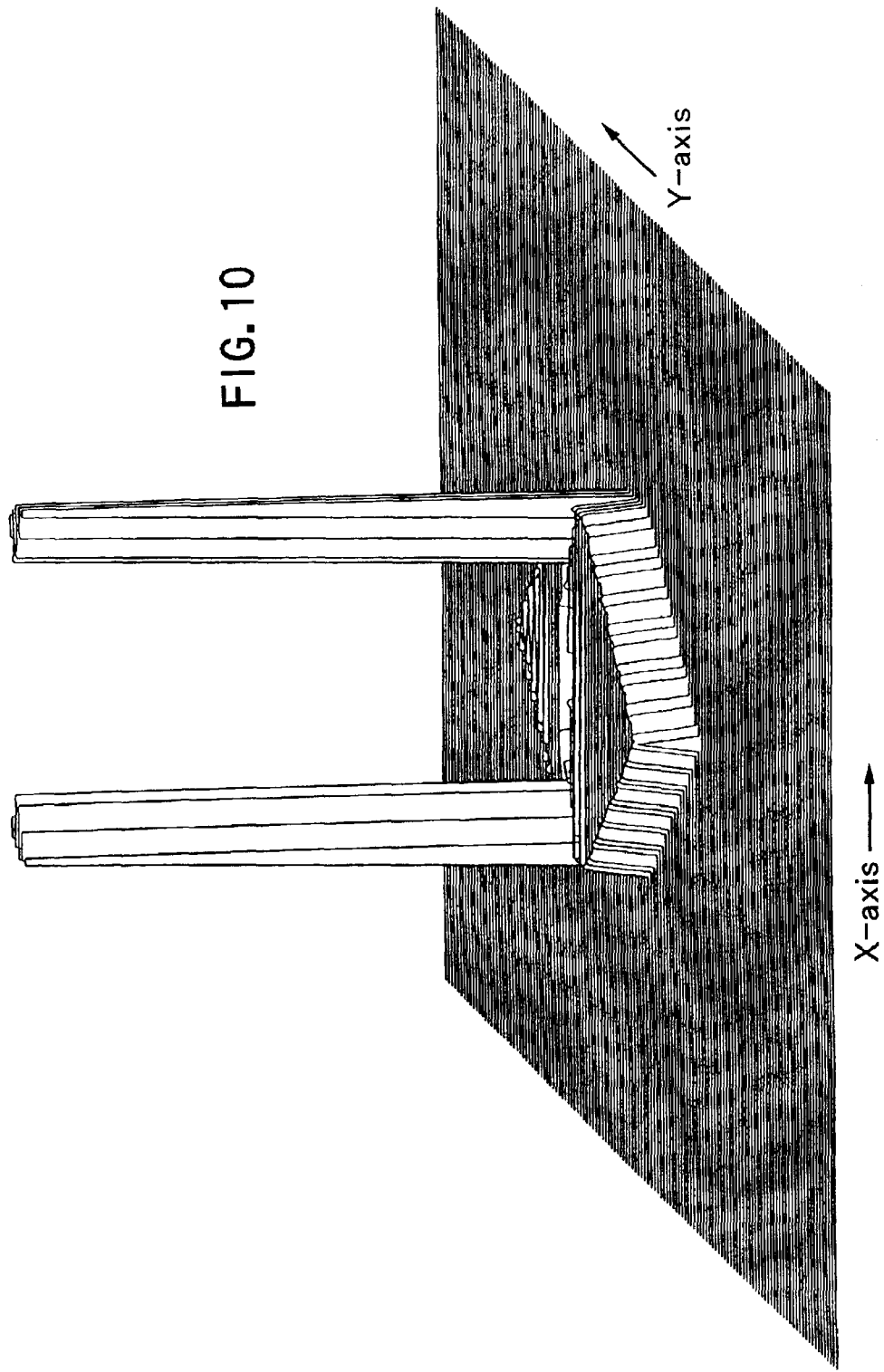

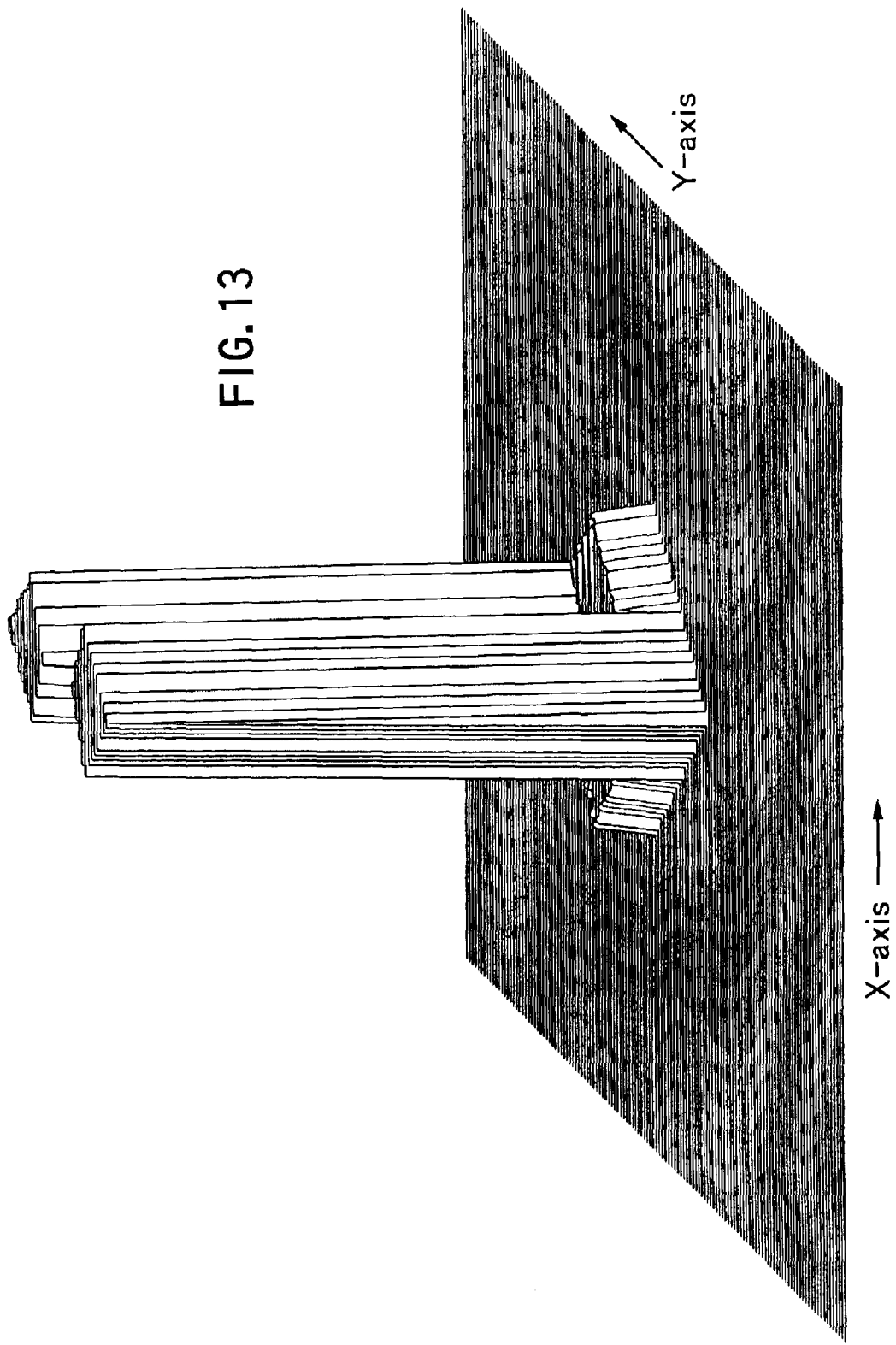

LENS DIAPHRAGM DEVICE, VIDEO CAMERA INCORPORATED WITH THE SAME, AND LENS FOR THE VIDEO CAMERA

DETAILED DESCRIPTION OF THE INVENTION

1. Field of the Invention

The present invention relates to a lens diaphragm device used in lens system for optical instrument, primarily for a vide camera, and more particularly, it relates to a lens diaphragm device that has ND filters attached to a couple of notched diaphragm vanes used for regulating light amount, to a video camera incorporated with such a lens diaphragm device, and to a lens for the video camera.

2. Prior Art

In general, a lens used for various cameras such as a video camera has a lens diaphragm device having a couple of diaphragm vanes where notches respectively defined in the vanes are capable of variably eclipse light flux to adjust an amount of light. In some recently developed video cameras, imaging devices are highly sensitive, and hence, an aperture of the lens diaphragm must be reduced when shooting a highly luminant object. When the aperture of the lens diaphragm is extremely reduced, an aperture of the lens diaphragm causes diffraction which adversely results in a decrease in resolution.

In order to overcome such a disadvantage, there have been proposed many lens diaphragm devices that have ND filters attached thereto to cover bottoms of the notches of the diaphragm vanes and serving to reduce a light transmissivity. A lens diaphragm device disclosed in Japanese Patent Laid-Open No. H08-43878 is an example configured in such a manner. The ND filters, attached to the bottoms of the notches, shield an aperture of the lens diaphragm when the aperture is adjusted by the notches of the diaphragm vanes to a small size, and hence, even when the aperture of the lens diaphragm stays relatively large, the amount of light can be sufficiently reduced. In this way, an adverse effect of diffraction caused around the aperture of the lens diaphragm can be restricted.

Although the diffraction caused upon reducing the aperture can be restricted by the ND filters interposed in the aperture of the lens diaphragm, there arises another adverse phenomenon resulting in a decrease in resolution. For instance, end faces of the ND filters, which define part of the aperture of the lens diaphragm along with the diaphragm vanes, reflect light into flares that reach a focusing plane, which resultantly is an additional cause of a decrease in resolution. Without restraining the flares, as the diaphragm is reduced in its aperture from a fully opened state and lets the ND filters intersect the aperture, the resultant image is degraded even with a relatively large aperture of the diaphragm at which usually a reduction of the image quality due to the diffraction should not be significant. It is also known that such degradation of the image due to the flares may be caused because an aperture of the diaphragm varies depending upon a shape of the lens diaphragm and a manner in which the ND filters are affixed thereto.

Accordingly, it is an object of the present invention to provide a lens diaphragm device that can avoid degradation of an image due to both the diffraction and the flares, a video camera incorporated with such a lens diaphragm device, and a lens for the video camera.

To overcome the above mentioned disadvantage of the prior art, a lens diaphragm device according to the present invention includes diaphragm vanes that respectively have notches opposed to each other in a single plane perpendicular to an optical axis, and two of the vanes are moved close to and apart from the optical axis in the single plane so as to vary an aperture of the lens diaphragm. The lens diaphragm device also includes two optical filters used to reduce an amount of a beam of light passing through the diaphragm, and an aperture of the diaphragm defined by edges of the optical filters and the notches of the vanes is shaped to be asymmetrical about straight line which crosses the optical axis and is perpendicular to directions of the motion of the vanes.

With such a configuration of the present invention, when the aperture of the diaphragm is large, most of the light beam incident upon the diaphragm device passes between the notches of the vanes. As the aperture of the diaphragm is decreased, a major part of the light beam incident upon the diaphragm device is transmitted through the optical filters attached to the bottom of the notches. In this situation, the asymmetrical shape of the aperture of the diaphragm about the straight line crossing the optical axis and perpendicular to the directions of the motion of the vanes causes flares due to end faces of the optical filters to be dispersed, and thus, an adverse effect of the flares can be restrained.

In this way, attained is the lens diaphragm device that can avoid degradation of an image due to both the diffraction around the aperture of the diaphragm and the flares of the end faces of the optical filters.

Edges of the optical filters defining the diaphragm aperture can be shaped in arcs.

One of the edges of the optical filters partially defining the aperture of the lens diaphragm may be shaped in arc projection while the other is shaped in straight line.

The edges of the optical filters partially defining the aperture of the diaphragm may be notched.

The lens diaphragm device configured in this way according to the present invention, when used in combination with an auto-focusing device, is prone to produce a pseudo-resolving peak, which might be a primary cause of a malfunction of the auto-focusing device.

Only one of the edges of the optical filters defining the aperture of the lens diaphragm may have a notch while the other is linearly shaped.

Preferably, the optical filters are ND filters.

In another aspect of the present invention, there is provided a video camera lens incorporated with any of the lens diaphragm devices as described above.

In still another aspect of the present invention, there is provided a vide camera incorporated with any of the aforementioned lens diaphragm devices.

BRIEF DESCRIPTION OF THE DRAWINGS

FIG. 8 is a 3-dimensional graph showing a distribution of transmissivity of a light beam passing through the lens diaphragm device at the aperture as shown in FIG. 7(d);

FIG. 9 is a graph showing an MTF defocusing property at a spatial frequency of 10 per millimeter when the lens diaphragm having a distribution of transmissivity of the light beam as shown in FIG. 8 is attached to the lens;

FIG. 10 is a 3-dimensional graph showing a comparison example of the distribution of transmissivity of the light beam passing through the lens diaphragm device at the aperture of the diaphragm as shown in FIG. 4(c);

FIG. 13 is a comparison example of a 3-dimensional graph showing a distribution of transmissivity of the light beam passing through the lens diaphragm at an aperture of the diaphragm as shown in FIG. 12(d);

DESCRIPTION OF THE BEST MODE OF THE INVENTION

Figure 1:
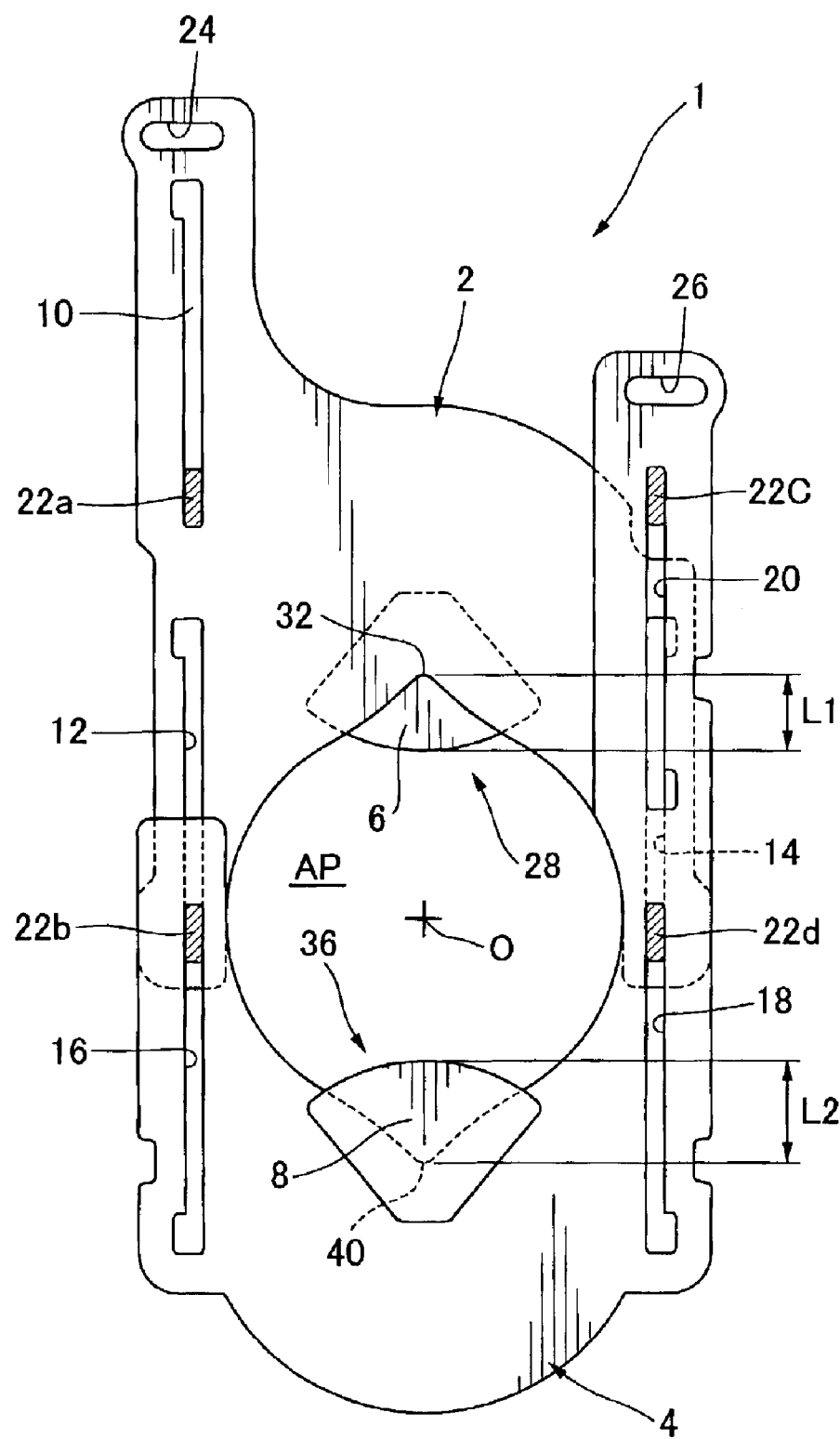
FIG. 1 is a front view showing two lens diaphragm vanes combined together for use in a first preferred embodiment of a lens diaphragm device according to the present invention.

Preferred embodiments of a lens diaphragm device according to the present invention will now be described in conjunction with the accompanying drawings. First, referring to FIGS. 1 to 3 and 4(a) to 4(d), a first embodiment of the present invention will be detailed. FIG. 1 is a front view showing two lens diaphragm vanes combined together for use in the first embodiment of the lens diaphragm device, FIGS. 2 and 3 are front views respectively showing first and second ones of two of the diaphragm vanes, and FIGS. 4(a) to 4(d) are diagrams showing variations in a shape of an aperture of the lens diaphragm at an aperture varied stepwise.

As shown in FIG. 1, the first embodiment or lens diaphragm device 1 according to the present invention is comprised of a first diaphragm vane 2 having a notch 28 at its lower end, a second diaphragm vane 4 having a notch 36 at its upper end, an optical filter attached to the first vane 3, or namely, a first ND filter 6, a second ND filter 8 attached to the second vane 4, and an actuator (not shown) vertically moving two of the diaphragm vanes, and an aperture AP of the diaphragm is defined between the notches 28 and 36.

Figure 2:
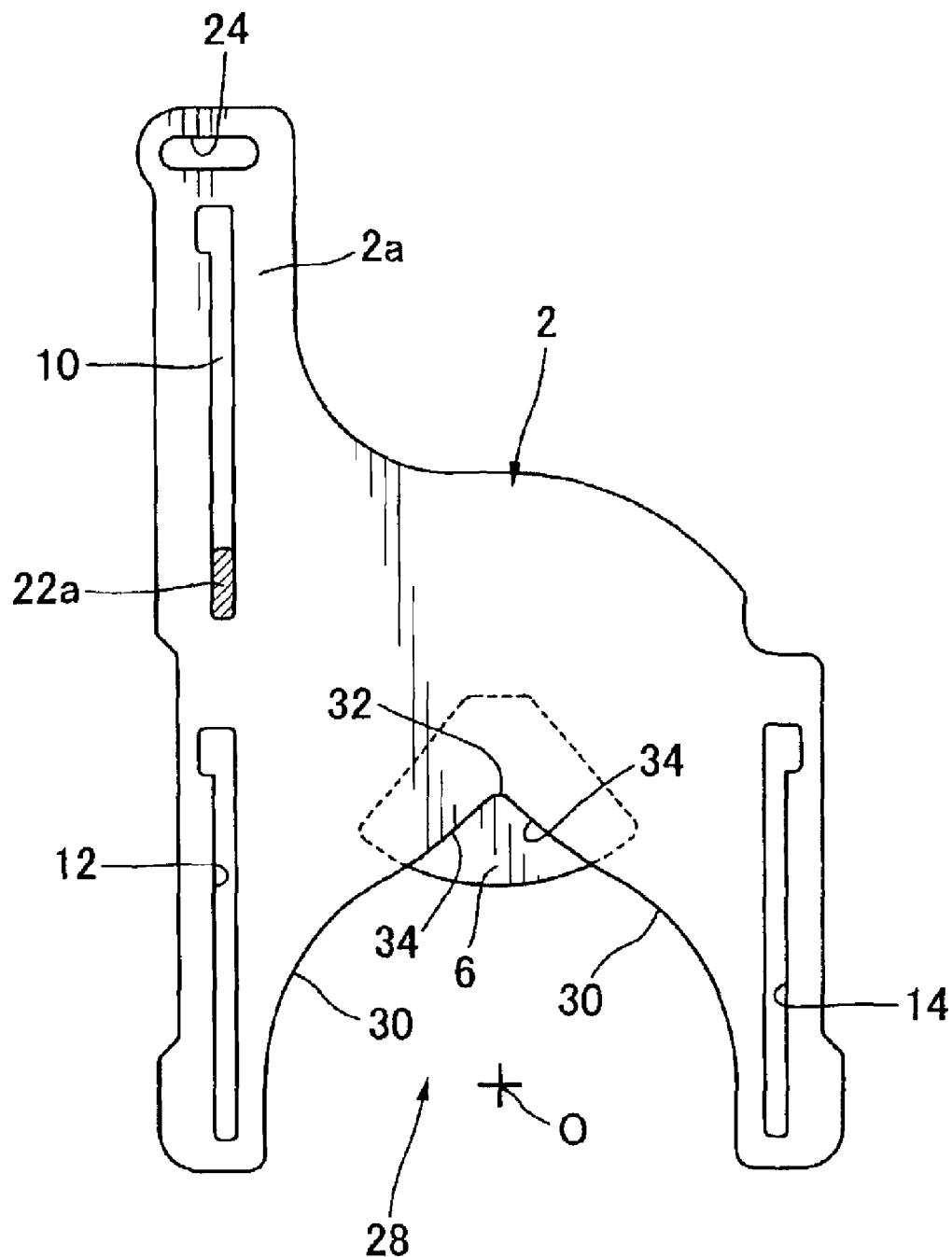
FIG. 2 is a diagram showing a first one of two of the diaphragm vanes in FIG. 1.

As can be seen in FIG. 2, the first vane 2 is an approximately rectangular thin plate shaped to have its upper left extending upward in a projection 2a and to have its lower side sunk into an approximately semicircular notch 28. The roughly semicircular notch 28 is composed of two approximately arcuate segments 30 extending upward from the lower side of the first vane 2 and two linear segments 34 respectively contiguous to the arcuate segments 30 with smooth transitions, respectively, and the linear segments 34 meet each other at an apex 32 of the notch 28. At a deeper recessed segment of the notch 28 or in the vicinity of the apex 32 and the linear segments 34, the first ND filter 6 shaped like a fan is affixed from the rear side in the picture shown in FIG. 2. The first ND filter 6 has its arcuate edge faced toward a diverging clearance of the notch 28 while partially shielding the notch 28. In the projection 2a and the opposite sides of the diaphragm vane 2, there are provided vertically elongated holes 10, 12, and 14, respectively, which are used to assist in guiding the first vane 2 along raised guides 22a, 22b, and 22d. In an upper end of the projection 2a, a hole 24 is provided to move the first vane up and down by the actuator (not shown). In this embodiment, the first ND filter 6 is the one having a light transmissivity of about 10%.

Figure 3:
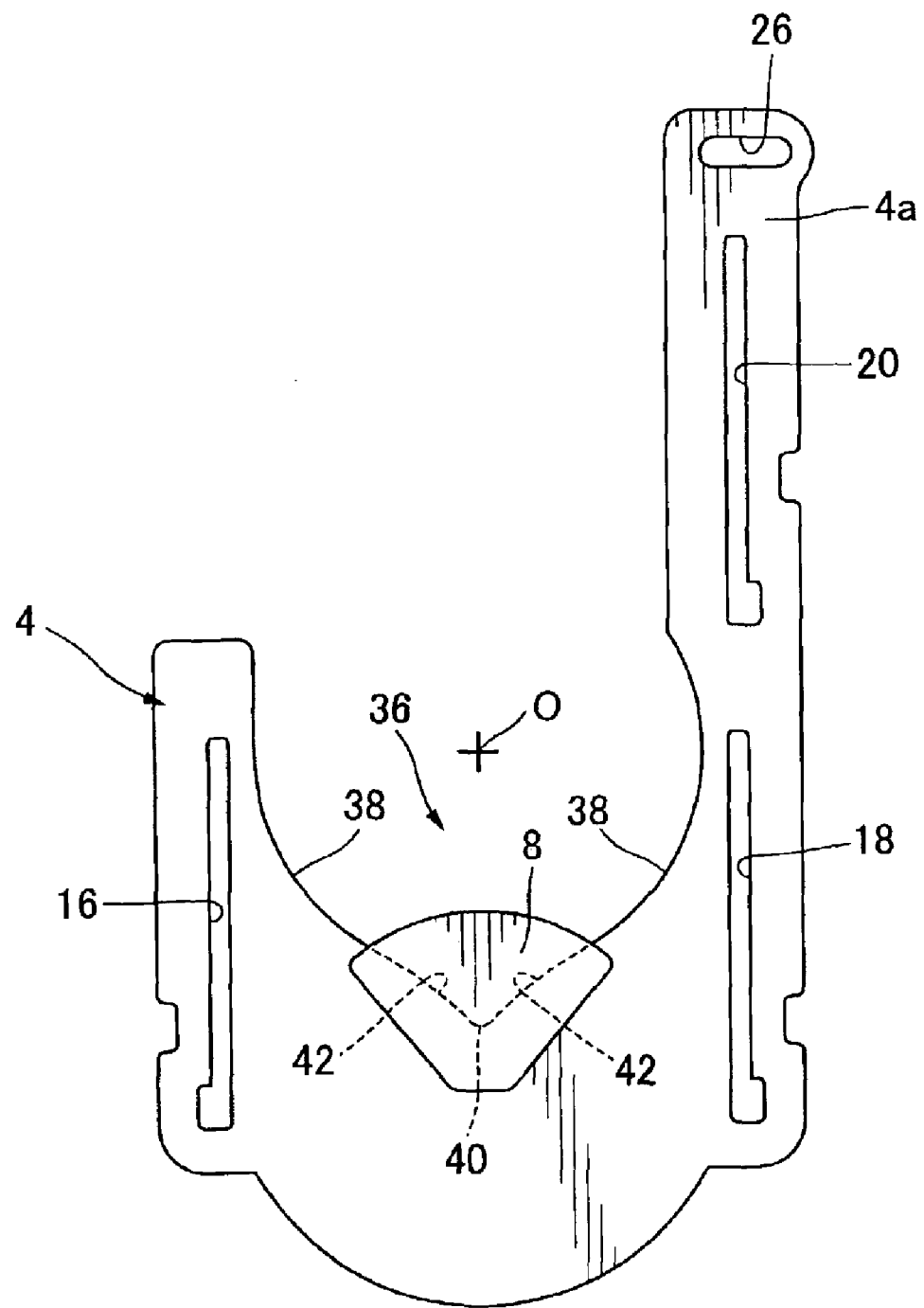
FIG. 3 is a diagram showing a second one of two of the diaphragm vanes in FIG. 1.

As depicted in FIG. 3, the second diaphragm vane 4 is an approximately rectangular thin plate which is shaped to have its upper right extending upward in a projection 4a and to have its upper side cut into an approximately semicircular notch 36. The roughly semicircular notch 36 is comprised of two approximately arcuate segments 38 extending downward from the upper side of the second vane 4 and two linear segments 42 respectively contiguous to the arcuate segments 38 with smooth transitions, respectively, and the linear segments 42 meet each other at an apex 40 of the notch 36. At a deeper recessed segment of the notch 36 or in the vicinity of the apex 40 and the linear segments 42, the second ND filter 8 shaped like a fan is affixed from the front side in the picture shown in FIG. 3. The second ND filter 8 has its arcuate edge faced toward a diverging clearance of the notch 36 while partially shielding the notch 36. In the projection 4a and the opposite sides of the diaphragm vane 4, there are provided vertically elongated holes 20, 16, and 18, respectively, which are used to assist in guiding the second vane 4 along raised guides 22c, 22b, and 22d. In an upper end of the projection 4a, a hole 26 is provided to move the second vane 4 up and down by the actuator (not shown). In this embodiment, the second ND filter 8 is also the one having a light transmissivity of about 10%.

In this embodiment as shown in FIG. 1, the aperture of the lens diaphragm defined by the notches 28 and 36 are symmetrical both vertically and horizontally about an optical axis O. On the contrary, the first and second ND filters 6 and 8 attached respectively to the vanes 2 and 4 are the same in shape but different in relative positions to the notches 28 and 36, and hence, the shape of the aperture AP of the diaphragm defined by the notches 28 and 36 and the edges of the first and second ND filters 6 and 8 is vertically asymmetrical about horizontal line passing the optical axis O. Thus, the first and second ND filters 6 and 8 are fixed to the vanes so that a vertical distance L1 from the apex 32 of the notch 36 to the lowermost end of the first ND filter 6 is different from a vertical distance L2 from the apex 40 of the notch 36 to the uppermost end of the second ND filter 8. In this embodiment, for the parameters like an F number of 1.4 and a full diaphragm aperture φ of 15, a difference between the distances L1 and L2 is about 1 mm. An appropriate value of the difference between the distances L1 and L2 varies depending upon the diameter of the diaphragm, and too large a difference causes the ND filter to intercept effective light flux upon fully opening the diaphragm to raise the F number relative to an effective aperture, and it also leads to a need for the lens diaphragm device of a larger size. As to the lens incorporated with this embodiment, the difference between the distances L1 and L2 of 0.5 to 1 mm brings about advantageous effects.

Now, with reference to FIGS. 1 to 4, use of the first embodiment of the present invention or the lens diaphragm device 1 will be described. FIG. 1 shows the first embodiment of the lens diaphragm device 1 being fully opened. In this state, the hole 24 is used to move the vane 2 downward by the actuator (not shown) while the hole 26 is used to pull the vane 4 upward by the same, and hence, the diaphragm aperture AP varies in diameter stepwise as illustrated in FIGS. 4 (*a*) to 4(*d*). As can be seen in FIG. 4(*a*), with the diaphragm being fully opened, the notch of the first diaphragm vane 2 and the notch 36 of the second diaphragm vane 4 define the aperture approximately circular in shape. When the aperture is relatively large, many effective fluxes exist, and therefore, there is reduced adverse effect of flares caused at end faces of the first and second ND filters.

As the aperture of the diaphragm is reduced stepwise as illustrated in FIGS. 4(*b*) to 4(*d*), the diaphragm aperture defined by the notches 28 and 36 adds stretches defined by the linear segments 34 and 42 to be deformed into a rough diamond. The diamond-shaped aperture is shielded by the first and second ND filters 6 and 8 attached to the notches 28 and 36 to further reduce an amount of a light beam passing therethrough. In a prior art lens diaphragm device, as the aperture is decreased as illustrated in FIGS. 4(*b*) to 4(*d*), there accordingly arises increased effect of the flares caused at the end faces of the filters, and a degradation of the resultant image becomes significant. In contrast, in the first preferred embodiment of the lens diaphragm device 1 according to the present invention, since positions where the upper and lower or first and second ND filters 6 and 8 are attached to the vanes are asymmetrical about horizontal line passing the optical axis O, the effect of the flares around the end faces of the ND filters are dispersed, and the eventual effect of the flares can be minimized. Thus, the attachment positions of the ND filters are shifted to adjust a balance of the flares from the end face of the first ND filter 6 to the flares from the end face of the second ND filter 8, and thus, deterioration of the resultant image is inconspicuous at any state of the aperture.

In this way, in the first embodiment of the diaphragm device 1 of the present invention, as the diaphragm aperture is reduced, the effect of the flares can be minimized to reduce a deterioration of the resultant image.

Then, with reference to FIG. 5, a second preferred embodiment of the present invention will be described. This embodiment of the lens diaphragm device is different from the above-mentioned first embodiment in that the ND filters attached to the first and second diaphragm vanes are differently shaped. Thus, only the difference of the second embodiment from the first embodiment will be described below. Like reference numerals denote the similar components, and explanation of them is omitted.

Figure 5:
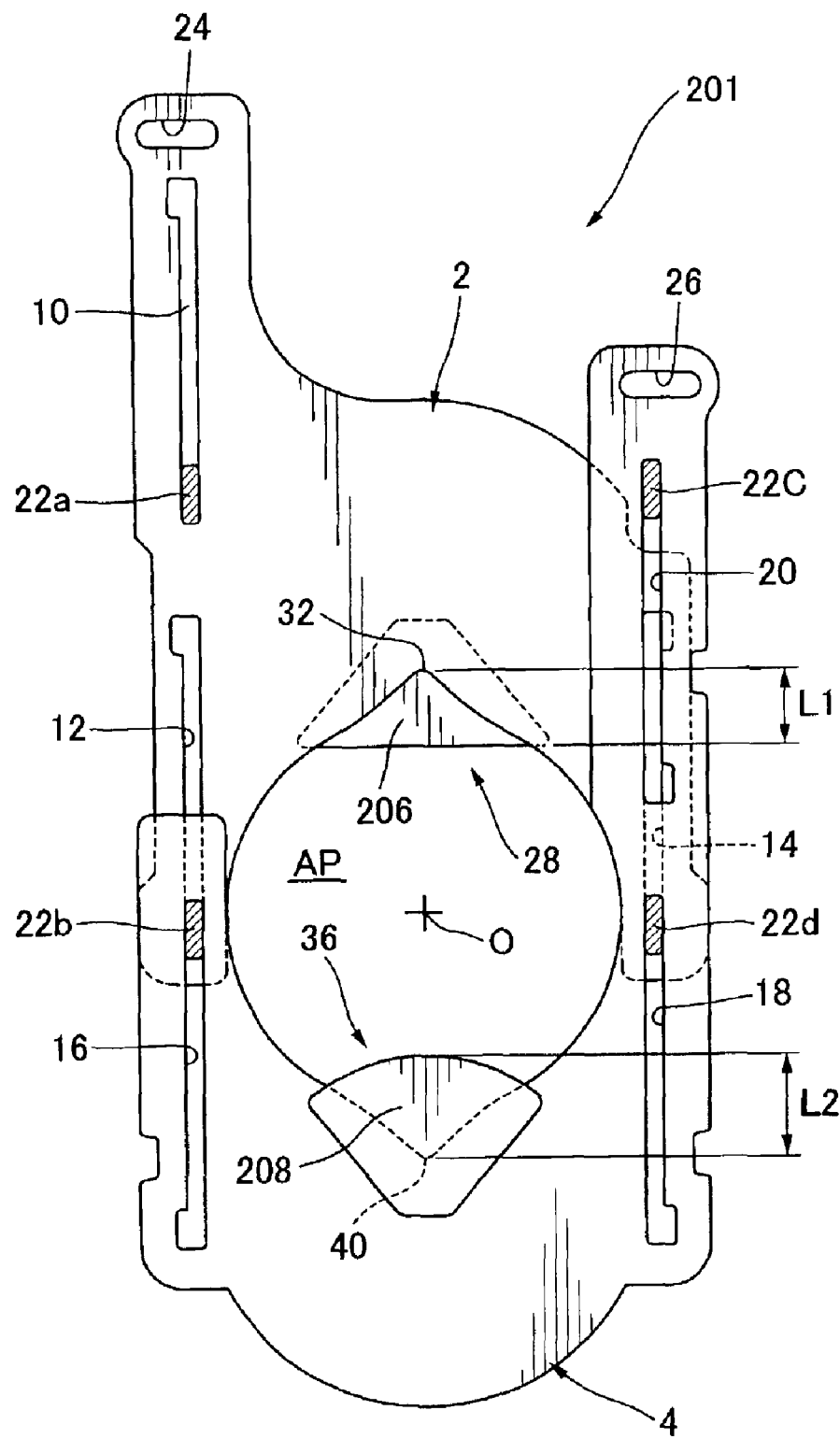
FIG. 5 is a front view showing two diaphragm vanes combined together for use in a second preferred embodiment of the stop diaphragm device according to the present invention.

As shown in FIG. 5, the second embodiment or a lens diaphragm device 201 includes a first diaphragm vane 2 having a notch 28 at its lower end, a second diaphragm vane 4 having a notch 36 at its upper end, an optical filter attached to the first vane 2, or namely, a first ND filter 206, a second ND filter 208 attached to the second vane 4, and an actuator (not shown) vertically moving two of the diaphragm vanes, and there is provided a diaphragm aperture AP between the notches 28 and 36. The first ND filter 206 shielding a deeper recess of the notch 28 is almost triangular in shape, and its end face shielding the diaphragm aperture is linear. The second ND filter 208 shielding a deeper recess of the notch 36 is shaped approximately like a fan, and it is similar in shape to the second ND filter of the first preferred embodiment.

In this embodiment, also, the first and second ND filters 206 and 208 are attached to the vanes so that a vertical distance L1 from an apex 32 of the notch 28 to the lowermost end of the first ND filter 206 is different from a vertical distance L2 from an apex 40 of the notch 36 to the uppermost end of the second ND filter 208. In this embodiment, for the parameters like an F number of 1.4 and a full diaphragm aperture φ of 15, a difference between the distances L1 and L2 is about 1 mm. With the first and second ND filters 206 and 208 thus configured and positioned, an adverse effect of flares caused at end faces of the ND filters can be minimized, and a degradation of the resultant image can be restrained. When the attachment of the first and second ND filters is reversed, or when the second ND filter 208 is attached to the first diaphragm vane 2 while the first ND filter 206 is attached to the second diaphragm vane 4, the similar effects can be attained.

A third preferred embodiment of the lens diaphragm device according to the present invention will now be described with reference to FIGS. 6 to 16. The lens diaphragm device of the present invention is different from the above-mentioned first preferred embodiment in that the ND filters attached to the diaphragm vanes are differently shaped. The diaphragm device of the present invention is also different from the above-mentioned embodiments in that it is compatible with an auto-focusing device of a type that seeks a focal point in a manner called "mountain climbing". Thus, only the difference of the third embodiment of the lens diaphragm device from the first embodiment will be described below where like reference numerals denote the similar components, and explanation about them is omitted.

Figure 6:
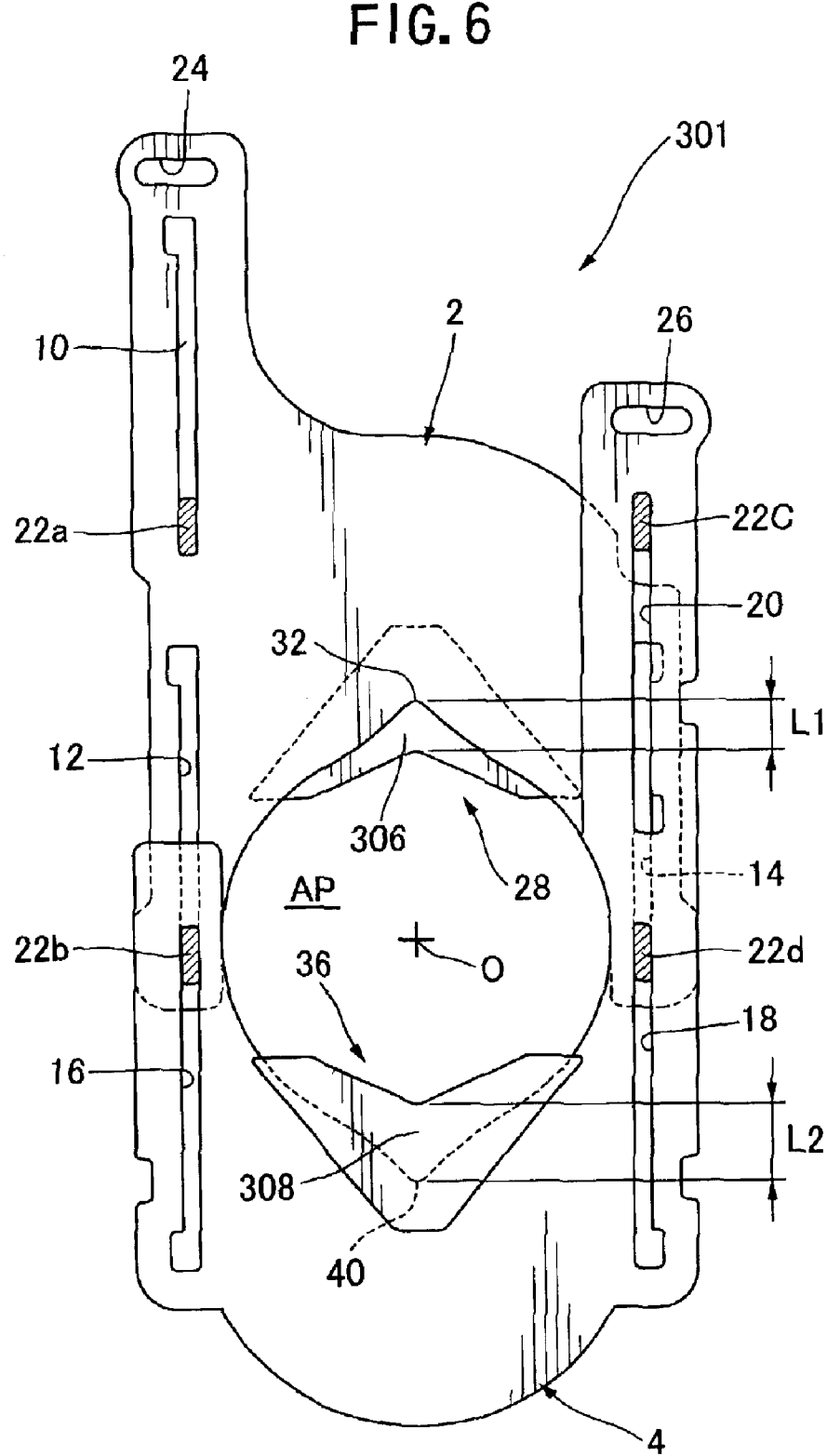
FIG. 6 is a front view showing two diaphragm vanes combined together for use in a third preferred embodiment of the stop diaphragm device according to the present invention.

As depicted in FIG. 6, the third embodiment or a lens diaphragm device 301 includes a first diaphragm vane 2 having a notch 28 at its lower end, a second diaphragm vane 4 having a notch 36 at its upper end, an optical filter attached to the first vane 2, or namely, a first ND filter 306, a second ND filter 308 attached to the second vane 4, and an actuator (not shown) vertically moving two of the diaphragm vanes, and there is provided a diaphragm aperture AP between the notches 28 and 36. The first ND filter 306 shielding a deeper recess of the notch 28 is almost triangular in shape, and a bottom side of the triangle is notched. The second ND filter 308 shielding a deeper recess of the notch 36 is shaped approximately the same. In this embodiment, the first and second ND filters are the ones that have a light transmissivity of about 10%.

In this embodiment, also, the first and second ND filters 306 and 308 are attached to the vanes so that a vertical distance L1 from an apex 32 of the notch 28 to an apex of the notch of the bottom side of the first ND filter 306 is different from a vertical distance L2 from an apex 40 of the notch 36 to an apex of the notch of the top side of the second ND filter 308. In this embodiment, for the parameters like an F number of 1.4 and a full diaphragm aperture φ of 15, a difference between the distances L1 and L2 is about 1 mm. With the first and second ND filters 306 and 308 thus configured and positioned, an adverse effect of flares caused at end faces of the ND filters can be minimized, and a degradation of the resultant image can be restrained.

Figure 7A:
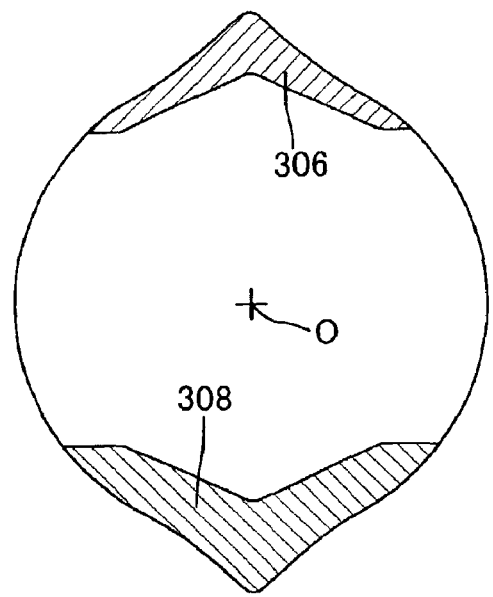
FIGS. 7(a) to 7(d) are diagrams showing variations in a shape of the aperture of the lens diaphragm at an aperture varied stepwise in the third preferred embodiment of the invention.
Figure 7B:
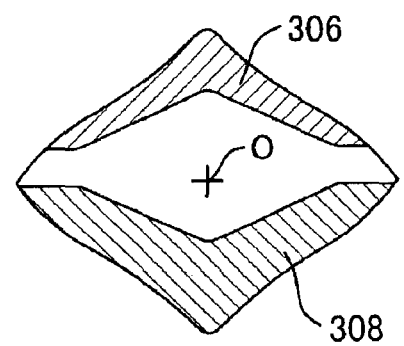
Figure 7C:
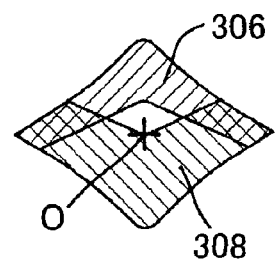
Figure 7D:
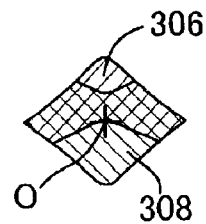
Figure 11:
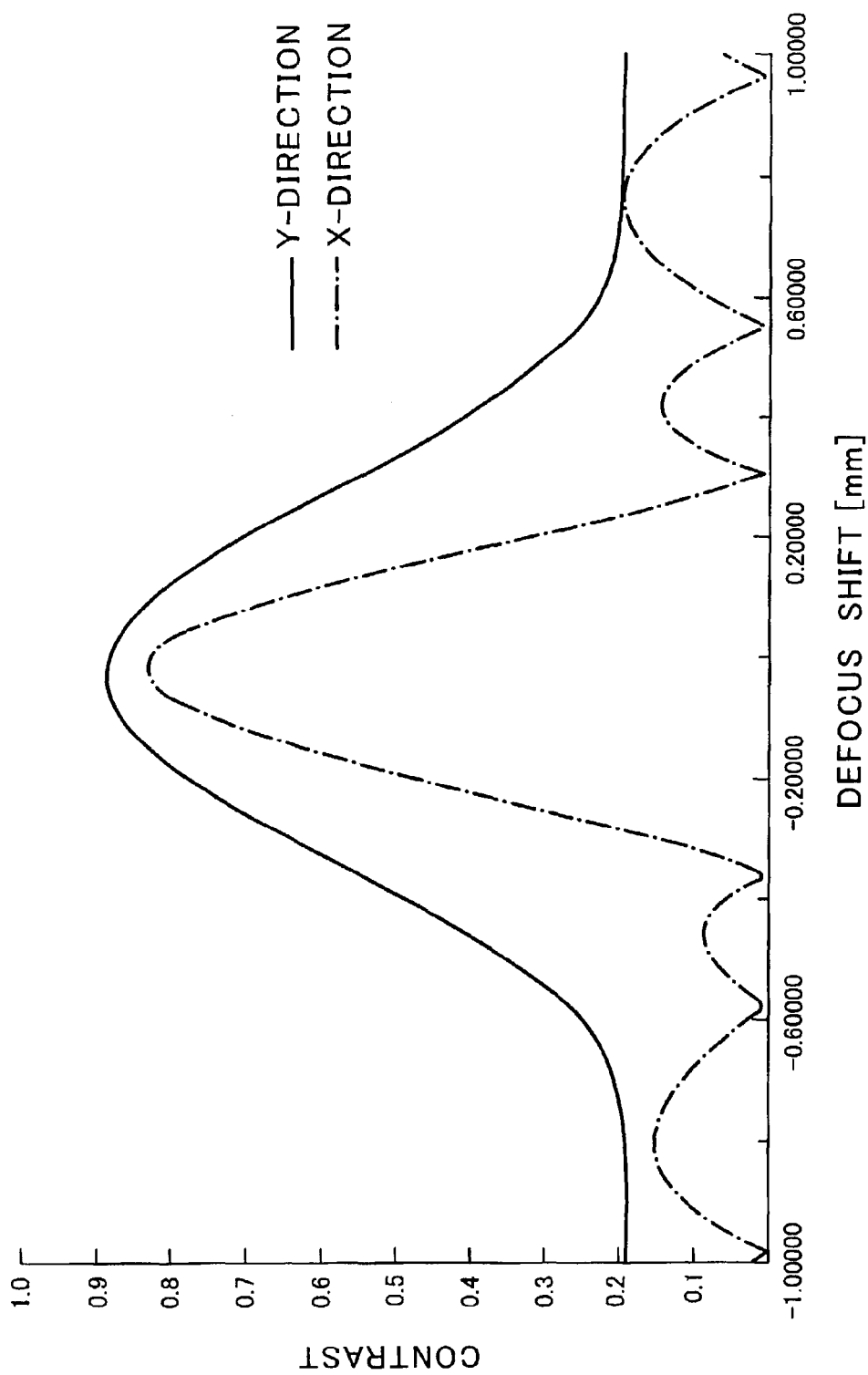
FIG. 11 is a graph showing an MTF defocusing property at a spatial frequency of 10 per millimeter when the lens diaphragm having a distribution of transmissivity of the light beam as shown in FIG. 8 is attached to the lens.
Figure 12A:
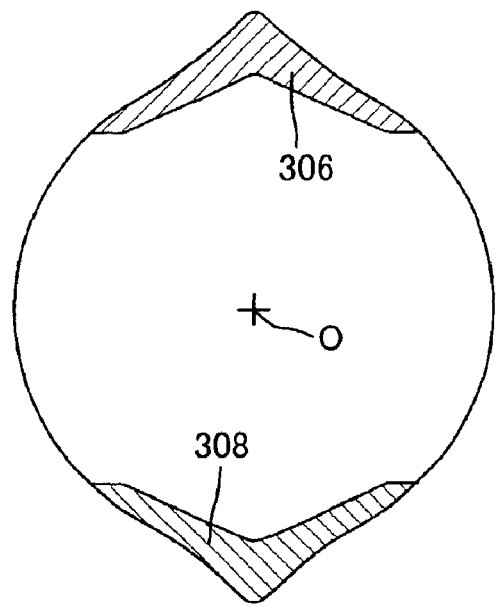
FIGS. 12(a) to 12(d) are diagrams showing variations in a shape of the aperture of the lens diaphragm at an aperture varied stepwise in a comparison example of the third preferred embodiment of the invention.
Figure 12B:
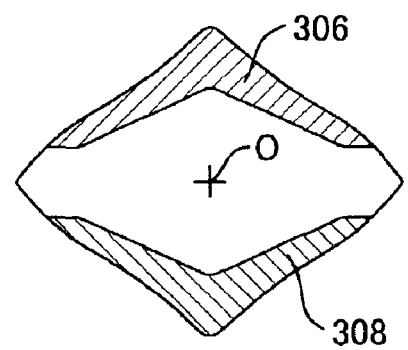
Figure 12C:
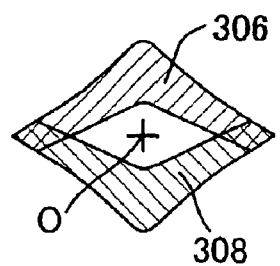
Figure 12D:
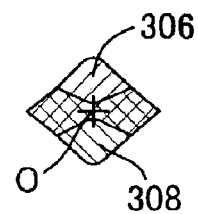

Now, compatibility of this embodiment or the lens diaphragm device 301 with an auto-focusing device will be discussed. FIGS. 7(a) to 7(d) are diagrams showing the diaphragm aperture is reduced stepwise in this embodiment or the lens diaphragm device 301 while FIG. 8 is a 3-dimensional graph showing a distribution of transmissivity of a light beam passing through the diaphragm device 301 at a diaphragm aperture as illustrated in FIG. 7(d). The X-axis of the graph represents a horizontal extension in FIGS. 7(a) to 7(d) while the Y-axis represents a vertical one. As recognized in FIG. 8, a fragment of the aperture where the diaphragm vanes 2 and 4 eclipse the light beam has a light transmissivity of about 0, a fragment of the aperture where the light beam is transmitted through either the first or second ND filter has a high transmissivity, and a fragment where the light beam is transmitted through both the first and second ND filters has a low transmissivity.

FIG. 9 is a graph showing an MTF defocusing property at a spatial frequency of 10 per millimeter when a lens is incorporated with the diaphragm device having a distribution of light transmissivity as shown in FIG. 8. The graph represents a contrast relative to each defocusing amount. Dashed line in the graph represents a defocusing property in a direction along the X-axis while solid line represents a defocusing property in a direction along the Y-axis. As can be seen in FIG. 9, since no pseudo-resolving peak of contrast appears for the X-direction defocusing property while that peak is smoothly rolling for the Y-direction defocusing property, it is supposed that malfunctions in auto-focusing are not likely to occur even if the diaphragm device 301 is applied to the lens having a "mountain climbing" auto-focusing device.

Figure 4A:
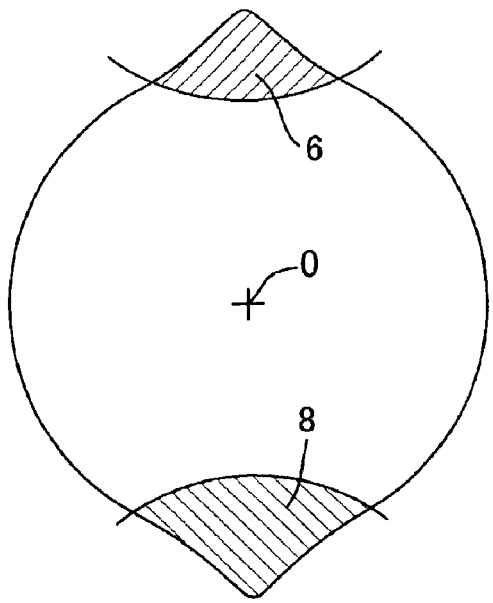
FIGS. 4(a) to 4(d) are diagrams showing variations in a shape of an aperture of the lens diaphragm at an aperture varied stepwise in the first embodiment of the lens diaphragm device according to the present invention.
Figure 4B:
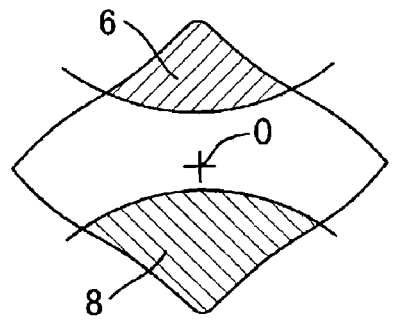
Figure 4C:
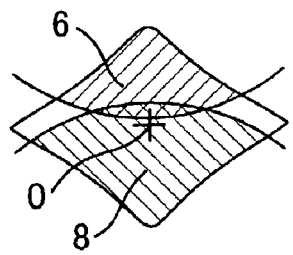
Figure 4D:
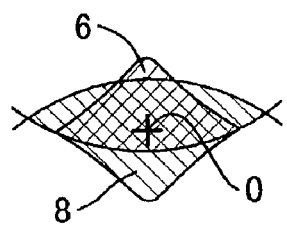

For a comparison example, a distribution of quantity of light and a defocusing property of the above-mentioned first embodiment of the diaphragm device 1 are given. FIG. 10 illustrates the distribution of quantity of the transmitted light at the diaphragm aperture as illustrated in FIG. 4(c). As can be seen in FIG. 10, two peak points of high luminance exist in a direction of the X-axis at the aperture of FIG. 4(c), and in such a situation, the pseudo-resolving peak upon defocusing is emphatic, which causes malfunctions of the auto-focusing device. Thus, when the distribution of quantity of light is as shown in FIG. 10, pseudo-resolving peaks appear in the X-direction of the graph as denoted by dashed line in FIG. 11, and therefore, the graph of the defocusing property gives the maximum value at points other than a point of zero defocusing amount in the graph. Hence, in the mountain climbing auto-focusing device where the maximum value in the graph of the defocusing property is sought to detect a focal position, it is often determined that an apical point of the pseudo-resolving peak should be the focal position, and this causes a malfunction in auto-focusing. Thus, it is hard to use the first embodiment of the diaphragm device 1 in combination with the auto-focusing device that utilizes horizontal image components of video signals.

Figure 14:
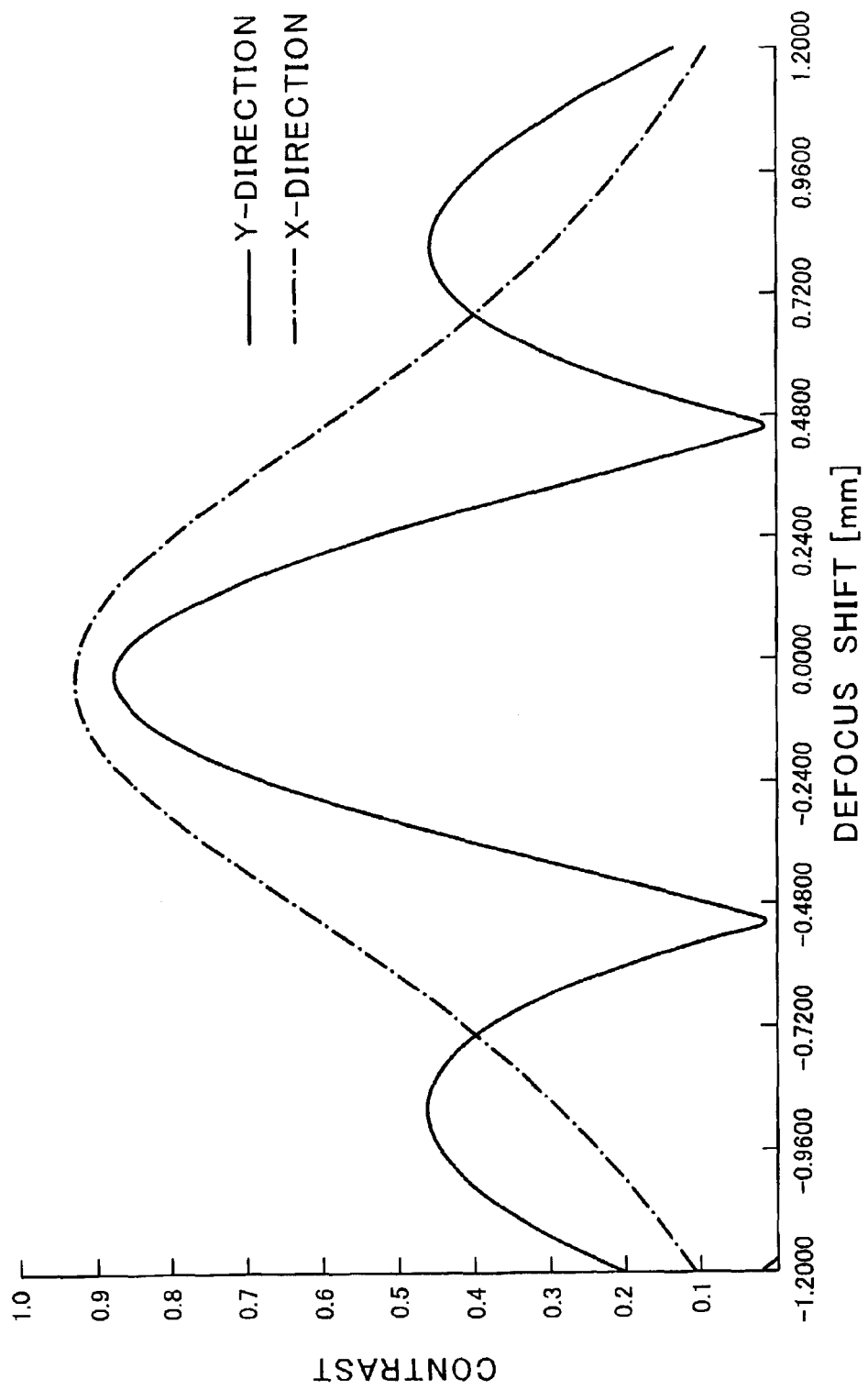
FIG. 14 is a graph showing an MTF defocusing property at a spatial frequency of 10 per millimeter when the lens diaphragm having a distribution of transmissivity of the light beam as shown in FIG. 13.

In another comparison example, discussed below will be the lens diaphragm device in which the first and second ND filters 306 and 308 are attached to the diaphragm vanes in counterpart positions, that is, in which L1 and L2 in FIG. 6 are equidistance. FIGS. 12(a) to 12(d) illustrates a diaphragm aperture of the lens diaphragm device reduced stepwise, FIG. 13 shows a distribution of quantity of light at a diaphragm aperture as shown in 12(d), and FIG. 14 depicts a defocusing property relative to the distribution of quantity of light. As shown in FIG. 14, with this diaphragm device, the defocusing property exhibits a pseudo-resolving peak for the direction of the X-axis but not in the direction of the Y-axis. Thus, the diaphragm device in this comparison example can be used in combination with the auto-focusing device that utilizes horizontal image components of video signals.

However, in this diaphragm device of this comparison example, when the light transmissivity of the ND filters is reduced, the ND filters themselves function similar to the diaphragm vanes. Hence, diffraction of light is caused by a minute gap between two of the ND filters at an aperture right before the diaphragm aperture is completely shielded by the ND filters, and a degradation of the resultant image becomes significant. Thus, In this diaphragm device, the light transmissivity of the ND filters cannot be lower than 10%. However, it is necessary that the ND filters have the light transmissivity of less than 10% for a highly sensitive camera such as a recent video camera because of a need for a diaphragm device that promises no degradation of an image in the operation with F/360.

Figure 15:
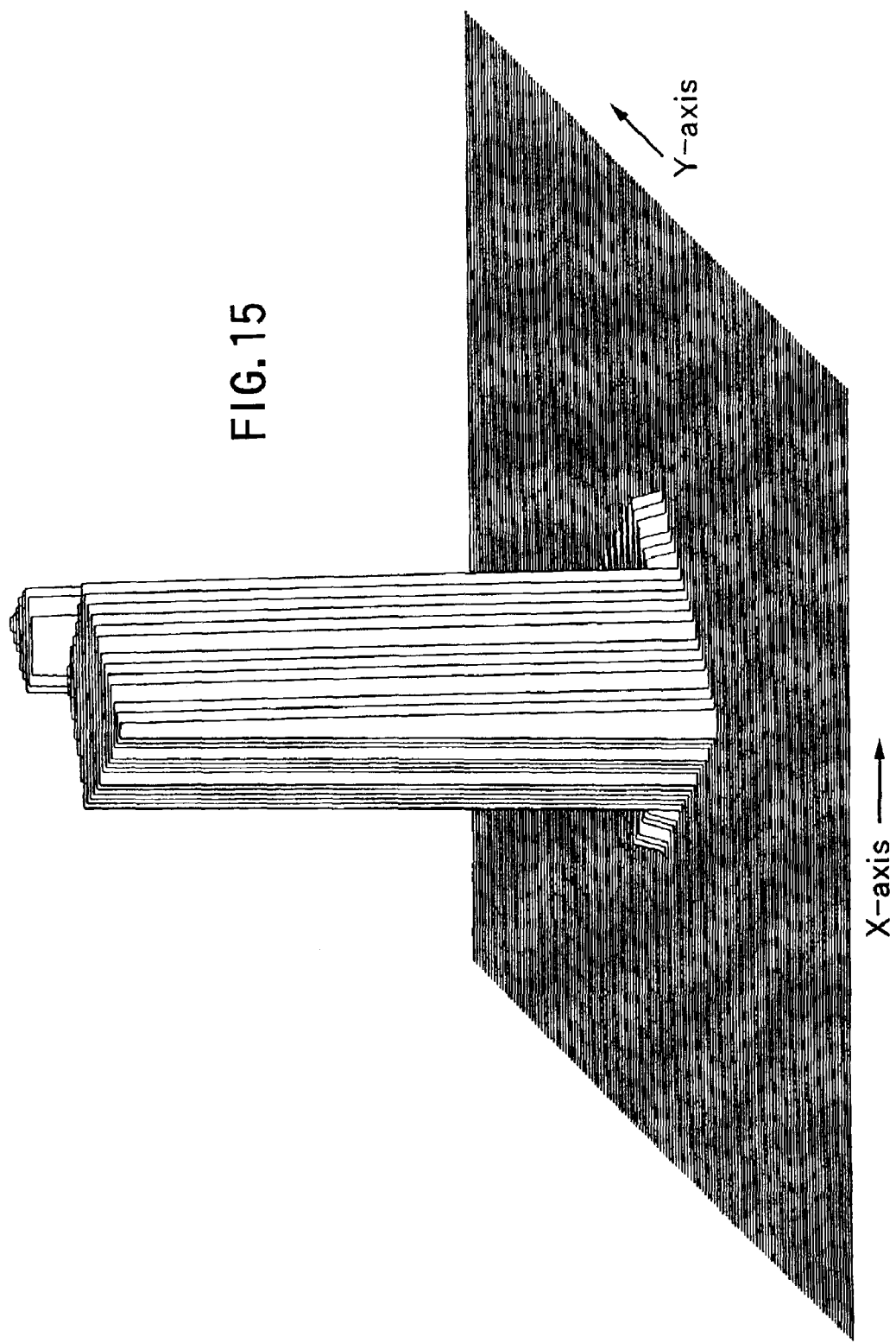
FIG. 15 is a 3-dimensional graph showing a distribution of transmissivity of the light beam when ND filters of lower light transmissivity are used for the third embodiment of the lens diaphragm according to the present invention.
Figure 16:
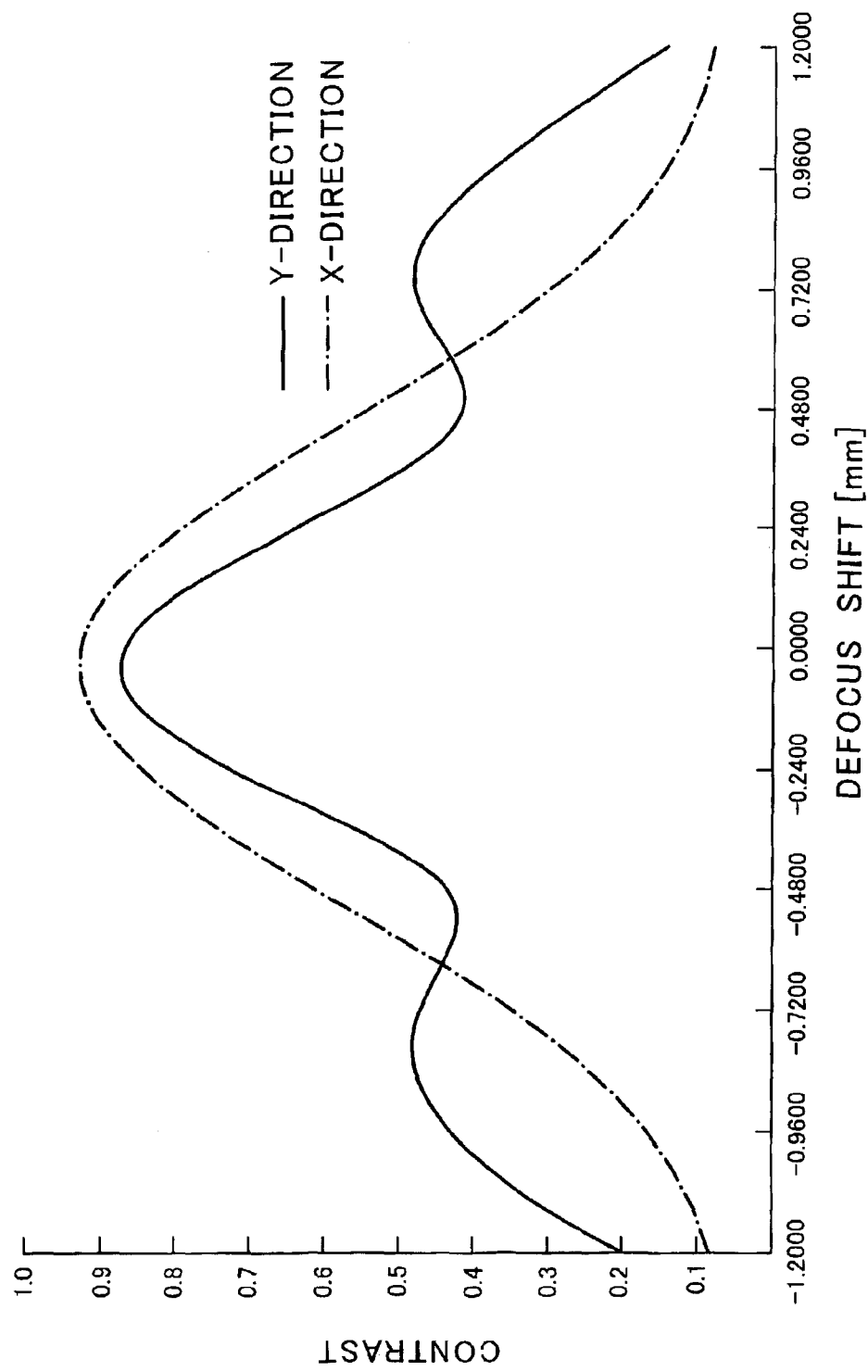
FIG. 16 is a graph showing an MTF defocusing property at a spatial frequency of 10 per millimeters when a lens is in combination with the lens diaphragm having the distribution of transmissivity as shown in FIG. 15.

In contrast, in the third embodiment of the diaphragm device 301, the ND filters having the light transmissivity less than 10% can be incorporated. FIG. 15 is a graph showing a distribution of quantity of light when the ND filters having the light transmissivity of 6.3% is incorporated in the third embodiment of the diaphragm device 301 while FIG. 16 is a graph showing a defocusing property for the distribution of quantity of light as shown in FIG. 15. As depicted in FIG. 16, no pseudo-resolving peak of contrast appears for the X-direction defocusing property while that peak is smoothly rolling for the Y-direction defocusing property, and apparently it is improved from the defocusing property in the Y-direction in FIG. 14. Also, in the diaphragm device 301, since a fraction of the diaphragm aperture that is shielded by only the first ND filter is different in area from a fraction that is shielded by only the second ND filter, no significant degradation of the resultant image occurs at any specific aperture as a result of the diffraction due to use of the ND filters having a low light transmissivity.

The third embodiment of the diaphragm device 301 according to the present invention can be applied to a lens incorporated with the auto-focusing device, and the resultant device promises no degradation of an image in the operation with F/360 or even above.

Moreover, the third embodiment of the diaphragm device 301 is compatible with the auto-focusing device without a deterioration of an image due to both the diffraction of light and the flares.

Figure 17:
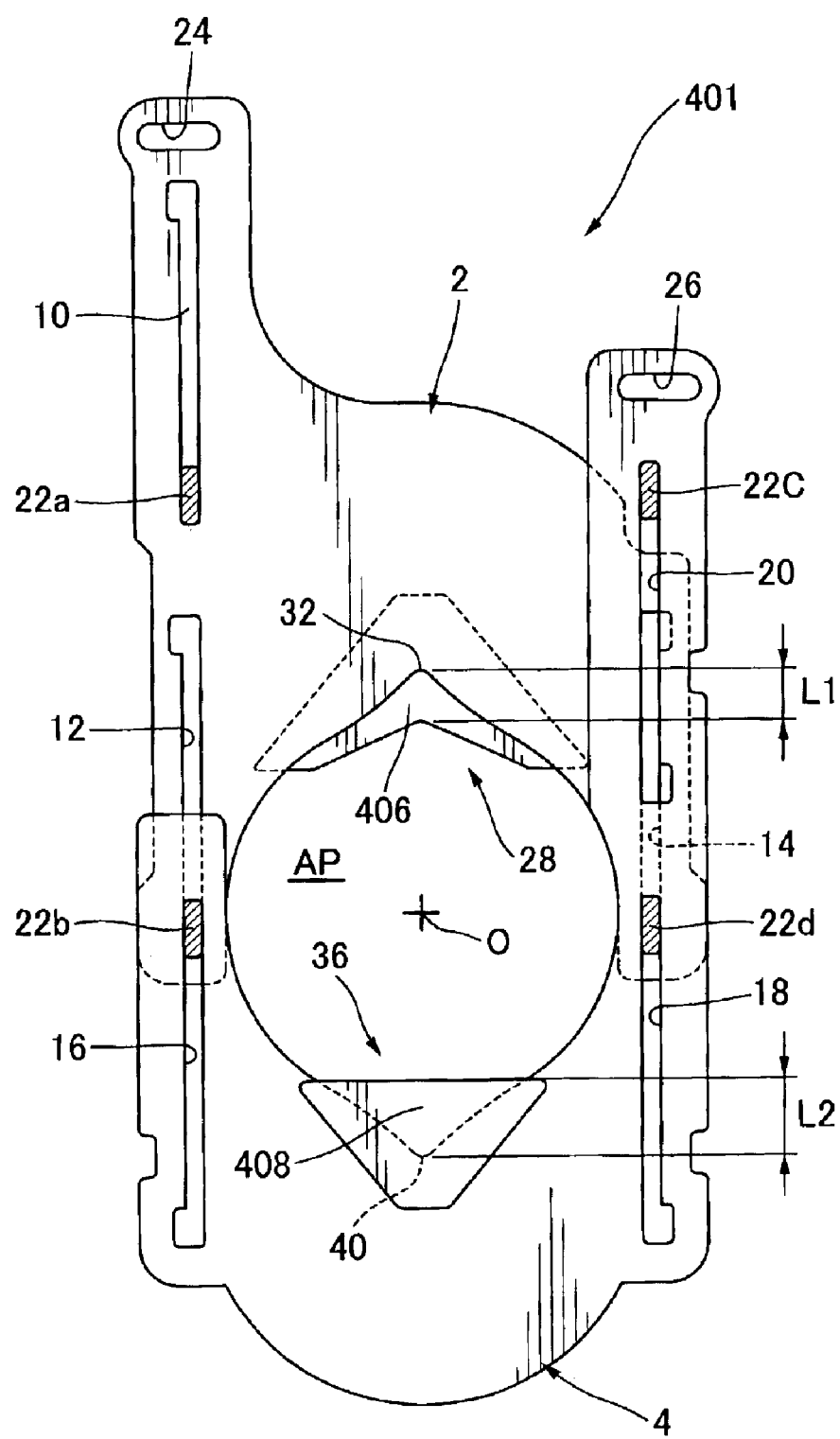
FIG. 17 is a front view showing two diaphragm vanes combined together for use in a fourth preferred embodiment of the lens diaphragm device according to the present invention.

Referring to FIG. 17, a fourth preferred embodiment of the diaphragm device according to the present invention will be described. This embodiment of the diaphragm device is different from the above-mentioned third embodiment in a shape of the ND filter attached to the second diaphragm vane. Discussed below will be the difference of the fourth embodiment of the diaphragm device from the third embodiment where like reference numerals denote the similar components, and explanation of them is omitted.

As shown in FIG. 17, the fourth embodiment or a diaphragm device 401 includes a first diaphragm vane 2 having a notch 28 at its lower end, a second diaphragm vane 4 having a notch 36 at its upper end, an optical filter attached to the first vane 2, or namely, a first ND filter 406, a second ND filter 408 attached to the second vane 4, and an actuator (not shown) vertically moving two of the diaphragm vanes, and there is provided a diaphragm aperture AP between the notches 28 and 36. The first ND filter 406 shielding a deeper recess of the notch 28 is almost triangular in shape, and a bottom side of the triangle is notched. The second ND filter 408 shielding a deeper recess of the notch 36 is shaped like a rough triangle having no notch.

In this embodiment, also, the first and second ND filters 406 and 408 are attached to the vanes so that a vertical distance L1 from an apex 32 of the notch 28 to an apex of the notch of the first ND filter 406 is different from a vertical distance L2 from an apex 40 of the notch 36 to the uppermost end of the second ND filter 408. In this embodiment, for the parameters like an F number of 1.4 and a full diaphragm aperture φ of 15, a difference between the distances L1 and L2 is about 1 mm. With the first and second ND filters 406 and 408 thus configured and positioned, the adverse effect of flares caused at end faces of the ND filters can be minimized, a degradation of the resultant image can be restrained, and the diaphragm device becomes compatible with an auto-focusing device.

Although the preferred embodiments of the present invention have been described, various variations can be made to them. Especially, any of the embodiments of the diaphragm device according to the present invention can be applied to any appropriate camera other than video cameras.

Thus, in accordance with the present invention, there is provided a diaphragm device that can avoid a degradation of an image due to both diffraction of a light beam and flares, a video camera incorporated with such a diaphragm device, and a lens for the video camera.

What is claimed is:

1. A diaphragm device comprising
    two diaphragm vanes that respectively have notches opposed to each other in a single plane perpendicular to an optical axis, two of the vanes being moved close to and apart from each other in the single plane so as to vary an aperture of the diaphragm, and
    two optical filters having regular transmissivity attached to the diaphragm vanes to shield deeper recesses of the notches, the two optical filters being movable with the vanes to create a region of overlap of the two optical filters for reducing a quantity of a beam of light passing through the diaphragm,
    wherein an aperture of the diaphragm defined by edges of the optical filters is shaped to be asymmetrical about a straight line which crosses the optical axis and is perpendicular to directions of the motion of the vanes.

2. A diaphragm device according to claim 1, wherein the edges of the optical filters defining the aperture of the diaphragm is shaped in arcuate projections.

3. A diaphragm device according to claim 1, wherein one of the edges of the optical filters partially defining the aperture of the diaphragm is shaped in arcuate projection while the other is in straight line.

4. A diaphragm device according to claim 1, wherein the edges of the optical filters partially defining the aperture of the diaphragm is notched.

5. A diaphragm device according to claim 1, wherein one of the edges of the optical filters defining the aperture of the diaphragm may has a notch while the other is linearly shaped.

6. A diaphragm device according to claim 1, wherein the optical filters are ND filters.

7. A lens for a video camera that is incorporated with a diaphragm device defined as in claim 1.

8. A video camera incorporated with a diaphragm device defined as claim 1.

9. A diaphragm device according to claim 1, wherein the region of overlap of the two filters has a reduced transmissivity relative to the transmissivity of each of the two filters separately.

* * * * *